Patented Dec. 21, 1937

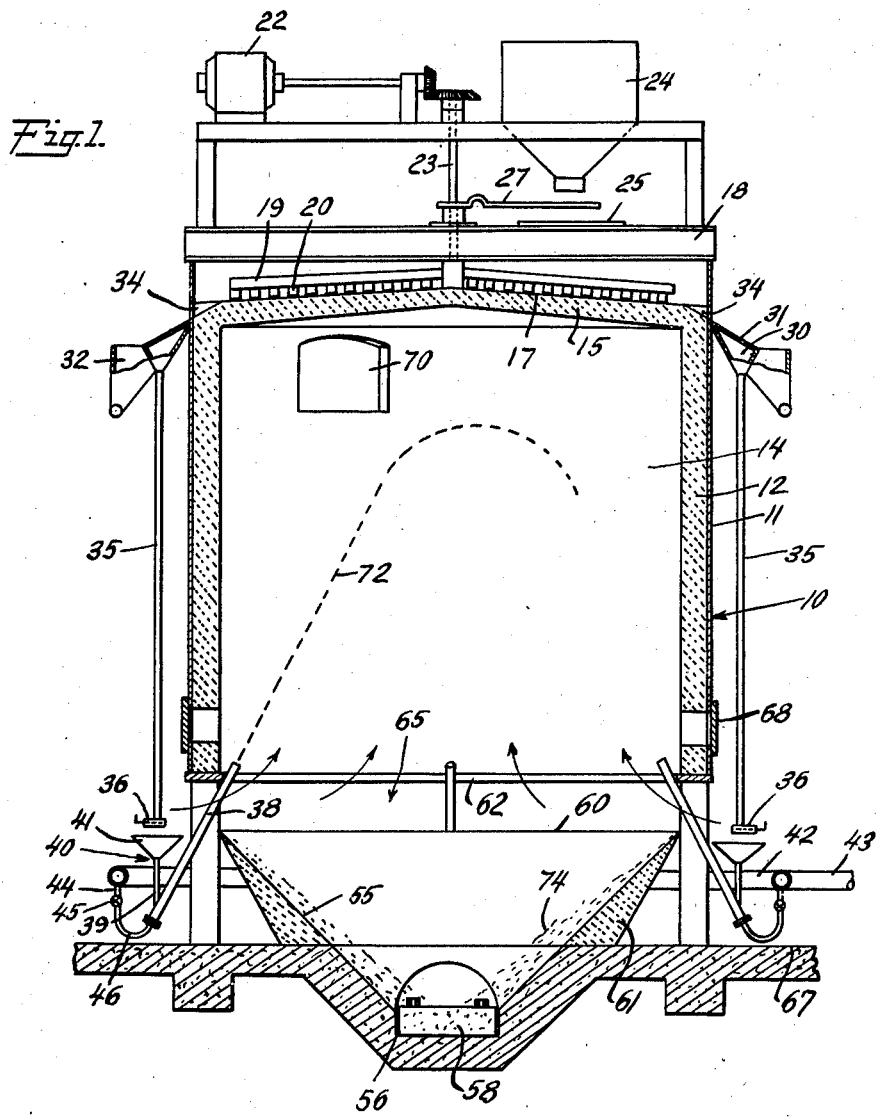
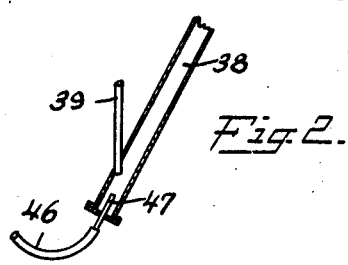

2,103,088

UNITED STATES PATENT OFFICE 2,103,088

APPARATUS FOR TREATING ORES

Edwin J. Mullen, New Rochelle, N. Y., assignor to General Chemical Company, New York, N. Y., a corporation of New York Application December 31, 1934, Serial No. 759,874

1 Claim. (Cl. 266—20).

This invention is directed to apparatus for roasting metal sulfides, and more particularly for roasting finely divided sulfides to desulfurize the same and to produce sulfur dioxide for use in the manufacture of sulfuric acid, or for any other purposes desired.

The nature of the invention and the objects and advantages thereof may be fully understood from a consideration of the following description taken in connection with the accompanying drawing showing in Fig. 1 a vertical section of a preferred form of burner for carrying out the improved process, and in Fig. 2 a vertical section of an injector.

Referring to the drawing, 10 designates a shaft burner, comprising a steel shell or casing 11 within which is placed the furnace lining 12, constructed of suitable refractory material such as firebrick and defining a roasting chamber 14 of cylindrical horizontal cross-section. The upper part of the combustion chamber is closed off by a crown 15 the top side of which forms a drying or preheating hearth 17. The shell 11 projects upwardly beyond the crown 15 and carries a steel framework 18 which in turn supports ore feeding and rabbling mechanism for the drying hearth.

The surface of hearth 17 is slightly cone-shaped and slopes downwardly toward the shell of the burner. Lying above the hearth are rabble arms 19 having downwardly projecting plows 20 pitched to work sulfides gradually toward the circumference of the drying hearth. Arms 19 are rotated by a motor 22 through shaft 23 supported in bearings so as to maintain the lower ends of the plows 20 spaced with respect to the surface of drying hearth 17. An ore bin 24 mounted on framework 18 discharges ore onto a platform 25 from which the fines are intermittently dropped onto the center of hearth 17 by a sweep 27 rotating with shaft 23.

Attached to shell 11 by suitable brackets not shown are hoppers 30 covered by sloping screens 31. Cut through the shell 11 and also in the upper edge of lining 12 are downwardly sloping passages or conduits 34 through which fines are passed from drying hearth 17 into hoppers 30. Oversized material discharged by screens 31 is collected by receptacles 32 and conveyed by means not shown to a crusher, or used in a bed roaster or otherwise disposed of. It will be understood the number of conduits 34 and hoppers 30 used in conjunction with the burner correspond with the number of ore injectors 40 employed. On rotation of rabble arms 19 the sulfide fines are gradually fed through openings 34 into hoppers 30 which discharge into injector feed pipes 35 having at their lower ends any suitable means such as slide valves 36 for controlling flow of fines out of the lower ends of pipes 35.

The ore injectors 40, shown more or less diagrammatically in the drawing, comprise principally an elongated pipe section or nozzle 38 constituting a fines inlet conduit. A pipe 39 carrying on the upper end a funnel 41 is arranged to feed fines into the lower end of nozzle 38. Air or other gas used to inject the fines into the burner is supplied from a bustle pipe 42 surrounding the lower end of the burner. Bustle 42 may be connected to a blower or other source of air through pipe 43. Adjacent each injector 40, pipe 42 is provided with an air outlet nipple 44 having a control valve 45. Numeral 46 represents a flexible hose connection attached at one end to nipple 44 and at the other end to jet 47. Each injector unit comprising a nozzle 38, a feed pipe 39 and a funnel 41 may be supported by suitable brackets, not shown, in such a way as to permit adjustment of the angle between the axes of nozzles 38 and the horizontal and also of the angle between the axes of nozzles 38 and the radii of the combustion chamber. The burner may be provided with any suitable number of injectors. In the embodiment illustrated, four injectors 40 are employed.

The bottom of the combustion chamber is formed by a hopper-shaped brick hearth 55 terminating in a pit 56 provided with an appropriate conveyor 58 by means of which cinder is discharged from the burner. The upper edge 60 of brickwork 61 forming the hearth 55 and pit 56 is spaced from the lower edge 62 of the burner proper so as to form a substantially uninterrupted peripheral opening or air inlet 65 at the base of the combustion chamber 14. This air inlet is of substantial vertical dimension, and as indicated in the drawing additionally provides an opening through which the upper ends of nozzles 38 extend. To save head room for the burner as a whole and to increase the effective height, part of hearth 55 and pit 56 and conveyor 58 may be below the floor level 67. The opening 65 also permits ready cleaning of hearth 55 if required.

A gas main 70, for withdrawing gaseous products of combustion from the burner opens into the combustion chamber 14 at a point just below crown 15.

The apparatus of the invention is applicable to the roasting of finely divided metal sulfides such as iron pyrites, pyrrhotite, zinc sulfide or arsenopyrite, but for convenience the operation of the process may be described in connection with the roasting of iron pyrites.

A supply of sulfide fines is maintained in the bin 24 by suitable conveyor or elevator mechanism, not shown. Before roasting is begun, combustion chamber 14 is preheated to temperatures above the ignition point of the particular ore to be roasted, as by the use of oil burners inserted through conveniently located work-holes such as 68, or through the ring-like air inlet 65. When the desired degree of preheat is obtained in the combustion chamber, motor 22 is started, and rabble arms 19 and sweep 27 may be rotated at a rate of, say, one revolution in two minutes. Fines run continuously out of the bin 24 onto platform 25, and on each revolution of shaft 23 a regulated quantity of ore is swept off the platform to approximately the center of hearth 17. During rotation of rabble arms 19, the sulfide fines are gradually worked across the surface of hearth 17 and into the several passages 34, each of which communicates with a hopper 30. The dry or dry and partly preheated fines run into sloping screens 31, which remove lumps, and thence into hoppers 30 and feed pipes 35.

Valves 36 in pipes 35 are adjusted so that a substantially steady stream of fines runs into the lower ends of nozzles 38 through funnels 41 and pipes 39. Air, steam, or other gas, not adversely affecting oxidation of the sulfide, may be employed to charge the fines into the combustion chamber. For this purpose it is preferred to employ air which may be admitted to the lower ends of nozzles 38 through jets 47 at pressures of, for example, about 5 pounds per square inch.

If the ore being roasted is of such nature that extraneous fuel is required to maintain proper roasting temperatures, such fuel in any suitable form may be introduced into the combustion chamber through the ore feed mechanism. For example, a combustible gas might be employed to inject the fines.

The particular angle of the axes of nozzles with the horizontal is dependent upon the particular size and type of combustion chamber which may be employed. The angle of the axes of nozzles 38, the amount of fines fed into the injectors through pipes 39, and the air pressure in jets 47, adjusted by valves 45, are all regulated with respect to the particular size of the roasting chamber so that the ore particles from each injector rise through the combustion chamber, away from the walls thereof, to an elevation just below the underside of crown 15. The angular position of nozzles 38 (which may be adjusted to suit particular operating conditions) and the rate of supply of ore and air thereto are likewise controlled so that the horizontal travel of the ore particles while reaching the top of the combustion chamber and after dropping to the bottom thereof, preferably does not exceed, say, three-quarters of the diameter of the roasting chamber. In this way, contact between any substantial quantities of ore particles and the hot walls of the roasting chamber is prevented, thus avoiding accumulation of scar on the walls. Referring to Fig. 1, the dotted line 72 indicates the approximate path of travel of an ore particle of average size introduced through the injector on the left side of the burner.

Since two or more injectors (in the present instance four) are preferably employed, contacting of ore particles constituting the individual streams fed into the combustion chamber by the separate injectors, breaks up the normal paths of travel of the ore particles so that the drop of the fines from the top to the bottom of the combustion chamber is a substantially straight line fall, or one at a high angle. With respect to the path of travel of fines through the combustion chamber, the ore particles move upwardly at an angle somewhat less than the pitch of nozzles 38, to an elevation just below crown 15 where because of commingling of the particles of several individual streams of fines, a relatively uniform dispersion is formed over a major portion of the upper end of the combustion chamber. The particles then settle in more or less straight lines, at a rate substantially as induced by gravity, toward the hearth in the bottom of the combustion chamber. In this way, the fines are caused to pass over substantially the longest possible path of travel, considering the proportions of the combustion chamber. Since in accordance with the present improvements the hearth 55 and cinder pit 56 are dropped substantially below the lower edge 62 of the combustion chamber proper, the path of travel of particles through the burner is still further lengthened. This prolongs the time of passage of each particle through the burner with the result that the capacity of a given unit is substantially increased.

During the latter part of the upward travel of the fines, the rate of vertical movement thereof rapidly decreases to zero, and thereafter, during the initial part of the descent of the fines, the rate of downward movement of the fines is relatively small. Hence, while passing upwardly and downwardly through the upper zone of the combustion chamber, the average rate of movement of the fines is low, and this slow rate of travel increases the time the particles are in the roasting atmosphere, thereby giving a relatively long time for the reaction to proceed, thus permitting use of a roasting chamber of relatively short vertical dimension, the roasting of relatively coarse ore, and increased capacity of the burner.

In accordance with the present invention, the major portion of the total quantity of air, or other oxidizing gas, necessary to support the oxidation reaction is drawn into the combustion chamber at the bottom through the relatively unobstructed ring-like gas inlet opening 65. Where air is employed for injecting the fines through nozzles 38, not more than about 10% of the total air required for oxidation would ordinarily be introduced through air jets 47, although larger amounts may be used if desired. In the preferred operation, where only a relatively small portion of total air is introduced through the injectors, it may be considered that substantially all the air is introduced into the combustion chamber through inlet 65 and flows upwardly through the furnace. In the specific embodiment of the invention described, the combustion chamber from the lower edge 62 of shell 11 to crown 15 is about 16 feet high, and the diameter of the combustion chamber is about the same. While such particular proportions of the roasting chamber are satisfactory, it is to be understood that the diameter of the chamber may, in some instances advantageously exceed the height by a substantial amount, and may also be somewhat less than the height. Since the combustion chamber preferably has a large diameter per unit of volume, it will be seen that the velocity of the upwardly flowing stream of oxidizing gas may be held at a minimum. Where the proportions of the combustion chamber are about as stated, the vertical dimensions of opening 65 (i. e., the distance from hearth edge 60 to shell edge 62) may be about 12 inches.

The sulfides dried and more or less preheated are injected into the bottom of the combustion chamber, and as substantially all the air for oxidation is drawn in through inlet 65, the fines are initially charged into an atmosphere rich in oxygen. Circular inlet 65 affords uniform admission of air at all points on the lower circumference of the combustion chamber, thus aiding rapid ignition of the fines. In operation, a relatively clear atmosphere exists in about the lower 30–48 inches of the vertical height of the combustion chamber, thus indicating the existence of a zone of relatively pure air, containing at the most but little sulfur dioxide. Although the atmosphere at and just above the ends of the nozzles is relatively cool because of the introduction of air through circular inlet 65 at about atmospheric temperature, the heating of the upwardly moving ore particles to the ignition temperature takes place rapidly, owing to the absorption of radiant heat from the combustion zone. The ore particles are raised to the ignition temperature within a short distance, say from about 10 to about 24 inches from the ends of nozzles 38. Thus, absorption of radiant heat and the presence of an atmosphere uniformly rich in oxygen created by uniform introduction of air through peripheral inlet 65, serve to bring about ignition of fines shortly after introduction into the base of the combustion chamber.

Following ignition, the fines rise to approximately the top of the combustion chamber, the temperature of the particles increasing because of rapidly progressing roasting. Although the air introduced through circular opening 65 is initially at about normal temperatures, the roasting operation is such that the temperature of the roasting atmosphere increases at a relatively uniform rate until the temperature of the gases in the top of the roasting chamber, on entering outlet 70, may be about 1800–2000° F. Conduit 70 is connected eventually to the inlet side of a blower so that the burner operates under a slight negative pressure.

At the uppermost point of travel of the fines, a relatively uniform distribution of partially roasted particles is formed over the major portion of the upper end of the combustion zone and the downward movement of the particles begins. The latter thereafter drop through the combustion chamber at a rate substantially the same as that of similar particles falling under the influence of gravity. In the preferred mode of operation, the fan in gas line 70 is operated so as to draw into the combustion chamber through inlet 65 sufficient oxygen to effect substantially complete oxidation of the fines and also so that the velocity of the rising stream of air through the combustion chamber is not sufficient to interfere with the free gravity fall of the fines. Because of the angular pitch of nozzles 38, and other above-noted control conditions, ore particles during the upward movement are not thrown against the walls of the roasting chamber, and thus avoid contact of fines with the hot walls of the combustion chamber when the fines are in a state conducive to scarring. As the downward flow of the fines is in substantially straight lines or at a high angle, subsequent contact of fines with the walls of the combustion chamber is avoided, thus further preventing conditions under which scarring might take place.

At the time downward movement of the ore particles begins, roasting is well under way, but because of the decreased sulfur content of the fines, further oxidation and removal of the residual sulfur proceed with less ease. To complete roasting, it is therefore desirable to cause the ore particles to pass through an atmosphere increasingly rich in oxygen and containing less sulfur dioxide. In the operation of the present process, this condition is present, and as the fines fall freely, they drop through an atmosphere increasingly rich in oxygen. On account of introduction of air through inlet 65 in the manner described, the air is distributed in an exceedingly uniform manner in the lower end of the burner, and because of the relatively slow upward flow of air through the combustion chamber, this uniform dispersion of oxidizing gas is maintained during upward flow of the oxidizing gas through the burner. In a zone of approximately 30–48 inches above edge 62, the ore particles drop through an atmosphere of substantially pure air. During fall of the fines, the temperature of the particles increases, promoting oxidation, and as the particles enter this air zone, scintillation of individual particles takes place, thus indicating oxidation of iron and temperatures of the iron oxide particles in the neighborhood of 2000–2600° F. The iron oxide cinder falling on hopper-shaped hearth 55 is finely divided, free-flowing, and runs into pit 56 whence it is removed by the conveyor.

In the furnace of Fig. 1, the pitch of the surface of hearth 62 may be considered, for example, as being greater than the angle of repose of the cinder. When this construction is employed, the cinder rolls down the hearth onto conveyor 58 which may be operated at such a rate as to permit a bed of cinder to be built up on the hearth as indicated on the drawing where the dotted line 74 represents the upper surface of a bed of cinder, lying at the angle of repose on the hearth, and covering substantially the entire surface of the hearth. Heat rising from the cinder bed aids in heating air entering through inlet 65 and enhances rapid ignition of the fines.

The sulfur dioxide gases produced may be used, for example, in the manufacture of sulfuric acid. The sulfur dioxide content of the burner gas may be regulated as desired by adjusting the amount of air fed into the combustion chamber as is known by those skilled in the art. Gases containing 10–12.5% sulfur dioxide may be readily made by the present process.

In the above description and in the appended claims, the term "fines" is intended to designate material of such degree of subdivision as may be roasted while suspended in oxidizing gas, one of the further advantages of the invention being that, by the process thereof, relatively coarse material, for example 35 mesh pyrrhotite may be roasted. The invention of this application is in some aspects related to that disclosed in my U. S. Patent No. 2,070,236 of February 19, 1937.

I claim:

Apparatus for roasting finely divided metal sulfides comprising a shell forming a vertically disposed combustion chamber, a plurality of sulfide fines feeding nozzles spaced about the periphery of the shell adjacent the base thereof, said nozzles being inclined at a relatively high angle to the horizontal and opening into the combustion chamber at points higher than the inlet ends of the fines feeding nozzles, means for feeding fines into the feed nozzles to charge fines into the combustion chamber, a hopper-shaped hearth positioned beneath the combustion chamber, the upper edge of said hearth being spaced substantially from the lower edge of the shell to thereby provide a peripheral air inlet for the combustion chamber, means for discharging cinder from the hearth, and a gas outlet at the top of the combustion chamber for withdrawing gaseous products of combustion.

EDWIN J. MULLEN.